March 12, 1935. H. M. ULLSTRAND 1,993,764
REFRIGERATION
Filed July 11, 1933
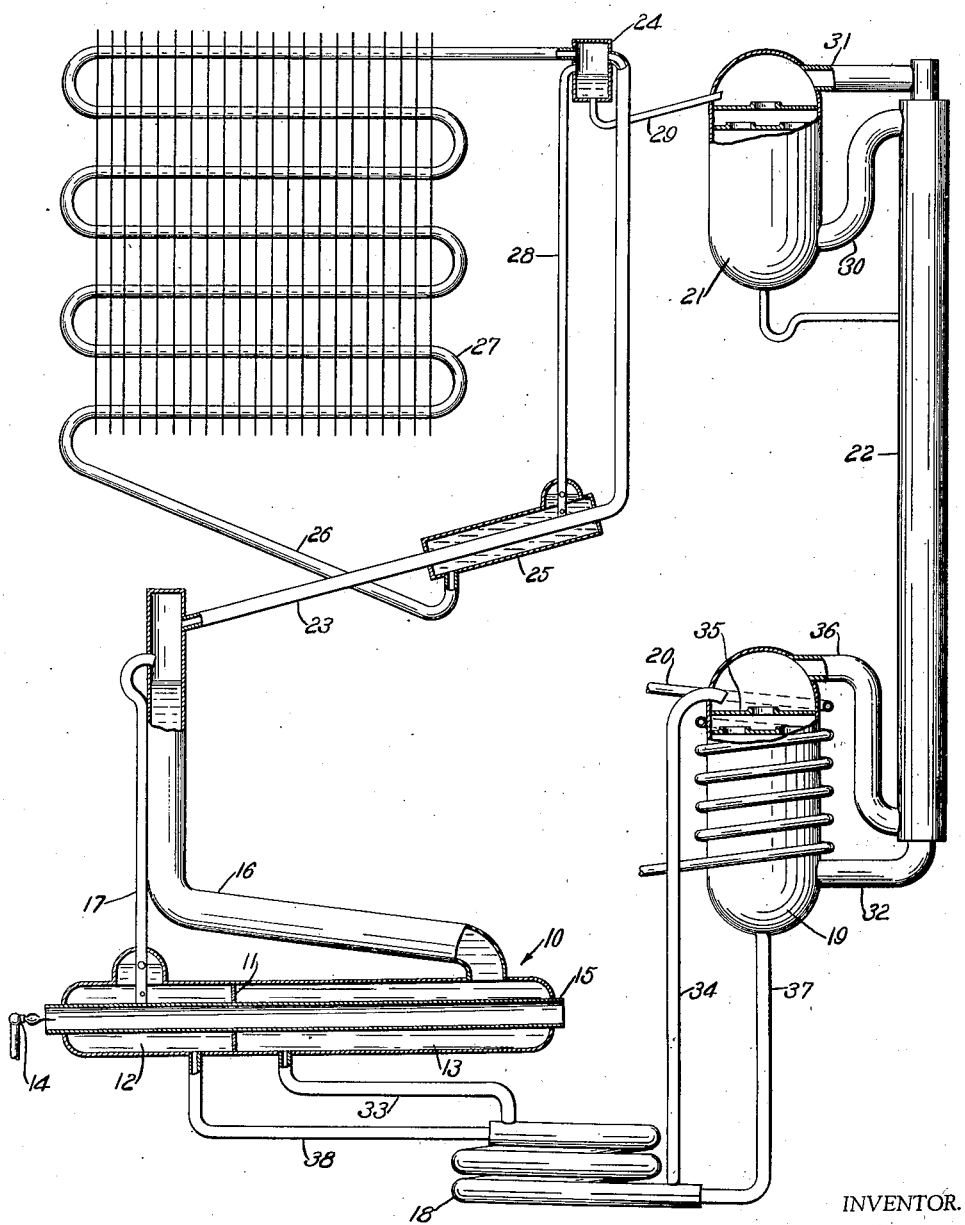
INVENTOR.
H. M. Ullstrand
BY
ATTORNEY.

Patented Mar. 12, 1935

1,993,764

UNITED STATES PATENT OFFICE 1,993,764

REFRIGERATION

Hugo M. Ullstrand, Evansville, Ind., assignor to Electrolux Servel Corporation, New York, N. Y., a corporation of Delaware Application July 11, 1933, Serial No. 679,830

14 Claims. (Cl. 62—119.5)

My invention relates to refrigeration and more particularly to an absorption refrigeration system of the pressure equalized type.

In accordance with my invention I provide an absorption refrigeration system of the pressure equalized type having a condenser extending below the level of liquid discharge into the evaporator. Such a system is particularly suitable for household refrigerators as explained in copending application Serial No. 613,387 of Albert R. Thomas. I effect upward flow of liquid from the condenser toward the evaporator independently of the production of refrigeration and utilize the liquid to rectify the distilled vapor and transfer heat of rectification in the system.

In general I carry out my invention by utilizing the heat of rectification of the distilled vapor to raise liquid refrigerant from the condenser to a higher level in its path of flow to the evaporator. The invention, together with the objects and advantages thereof, will be more fully understood by reference to the following description taken in connection with the accompanying drawing, in which, The figure shows schematically an absorption refrigeration system embodying my invention.

Referring to the drawing, the generator 10 is of a known type comprising a horizontal tubular portion divided by a partition 11 into a strong solution chamber 12 and a weak solution chamber 13, which chambers are adapted to be heated by any suitable heating means such as a gas burner 14 in a heating flue 15 which extends through both chambers. A generator standpipe 16 communicates at its lower end with the weak solution chamber 13. From within the strong solution chamber 12 there extends upwardly a thermosiphon conduit 17 into the upper end of the standpipe 16.

The generator 10 contains a solution of refrigerant in an absorption liquid such as a water solution of ammonia and is connected through a liquid heat exchanger 18 to an absorber 19 for circulation of solution therethrough as hereinafter described. The absorber may be cooled in any desired manner as by circulation of water through the cooling coil 20, circulation of air, or a suitable secondary cooling system as well known in the art.

An evaporator 21 is interconnected with the absorber 19 through a suitable gas heat exchanger 22 for circulation of an inert pressure equalizing gas such as hydrogen, as hereinafter described. From the upper part of the generator standpipe 16, a conduit 23 is connected to a separating vessel 24. Around the conduit 23 there is provided a jacket 25 connected through conduit 26 to receive liquid from a condenser 27 which may be of the coil type with radiation fins for air cooling as shown. Between the jacket 25 and the separating vessel 24 is provided a thermosiphon conduit 28. The upper part of the separating vessel 24 is connected to the upper end of the condenser 27 and the lower part of the separating vessel is connected through a liquid trap overflow conduit 29 to the upper end of the evaporator 21.

In operation, refrigerant vapor expelled from solution by heating in the generator 10 flows from the upper end of the generator standpipe 16 through conduit 23 and separating vessel 24 into the condenser 27. In the latter, the vapor is condensed to liquid which drains from the lower end of the condenser through conduit 26 into the jacket 25, around the conduit 23. Within the jacket 25 heat is transferred from the vapor flowing through conduit 23 to the liquid refrigerant in the jacket, thereby vaporizing some of the liquid. The vapor formed in the jacket 25 is utilized to raise liquid upwardly through the thermosiphon conduit 28 into the separating vessel 24 from where the liquid overflows through conduit 29 into the evaporator 21 and the vapor returns to the condenser 27. Due to the transfer of heat within the jacket 25, the temperature of the vapor flowing therethrough in conduit 23 is lowered, causing condensation of water or other absorption liquid vapor that may have been distilled along with the ammonia or other refrigerant vapor, and the condensate drains back to the generator through conduit 23. Thus the jacket 25 may be referred to as a rectifier. In this rectifier, the heat of rectification is utilized to raise liquid refrigerant from the condenser to a higher level in its path of flow toward the evaporator by thermosiphonic action.

It will be clear that the heat utilized to raise the liquid refrigerant from the rectifier to the separating vessel is supplied by the generator heating means, wherefore I obtain this upward flow of liquid at a rate dependent upon the heat input to the system, and independent of the production of refrigeration. The circuit formed by the condenser 27, conduit 26, rectifier 25, thermosiphon conduit 28, and separating vessel 24 is in effect a secondary vaporization-condensation cooling system, vaporization occurring in the rectifier 25 and condensation in the condenser 27.

In the evaporator 21, the liquid refrigerant evaporates by diffusion into a pressure equalizing gas such as hydrogen which enters the evaporator through conduit 30. The resulting gas mixture flows from the evaporator through conduit 31, gas heat exchanger 22, and conduit 32 into the absorber 19. From the generator chamber 13, weak absorption solution flows through conduit 33, liquid heat exchanger 18, and conduit 34 into the absorber 19 where it flows downwardly over baffle plates 35, absorbing ammonia out of the gas mixture. The weak gas returns from the absorber through conduit 36, gas heat exchanger 22, and conduit 30 to the evaporator 21. The enriched absorption solution accumulates in the lower part of the absorber 19 from where it flows through conduit 37, liquid heat exchanger 18, and conduit 38 into the strong solution chamber 12 of the generator. From the latter, solution is raised through conduit 17 into the upper end of the standpipe 16 by thermosiphonic action in a manner well known in the art.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. The method of refrigeration with an absorption system which includes, distilling vapor from solution by heating, condensing the vapor to liquid, conducting the liquid at a first level in heat exchange relation with the distilled vapor to cool the latter by vaporization, utilizing the vapor thus produced to lift cooling liquid to a higher level, and evaporating the liquid at said higher level.

2. Refrigeration apparatus including a generator containing a solution of refrigerant in an absorption liquid, an absorber interconnected with said generator for the circulation of absorption liquid therebetween, an evaporator interconnected with said absorber for the circulation of an inert gas therebetween, a gas and liquid separating vessel having a liquid trap overflow connection to said evaporator, a conduit for vapor from said generator to said vessel, a condenser connected to receive vapor from said vessel, and a thermosiphon arranged in thermal transfer relation with said vapor conduit and connected to receive liquid from said condenser and discharge liquid and gas into said separating vessel.

3. An absorption refrigeration system including a generator, means for heating said generator, an evaporator, a condenser, and means utilizing heat from vapors produced in said generator for causing flow of liquid from said condenser toward said evaporator.

4. An absorption refrigeration system including a generator, means for heating said generator, an evaporator, a condenser, and a thermosiphon utilizing heat from vapors produced in said generator for raising liquid from said condenser to a higher level in its path of flow toward said evaporator.

5. A refrigeration system including a generator, a condenser, an evaporator, an absorber, means interconnecting said elements to form a closed system for circulation of refrigerant fluid including a conduit for vapor from said generator to said condenser, means for accumulating liquid refrigerant from said condenser in thermal transfer relation with said generator vapor conduit at a level below said evaporator, and means for raising liquid from the accumulation into said evaporator.

6. Refrigeration apparatus including a generator containing a solution of refrigerant in an absorption liquid, an absorber interconnected with said generator for circulation of absorption liquid therebetween, an evaporator interconnected with said absorber for circulation of an inert gas therebetween, a gas and liquid separating vessel having a liquid trap overflow connection to said evaporator, a conduit for vapor from said generator to said vessel, a condenser connected to receive vapor from said vessel, a rectifier comprising a vessel adapted to maintain liquid received from said condenser in thermal transfer relation with said vapor conduit, and means for transferring liquid from said rectifier to a higher level in said separating vessel.

7. Refrigeration apparatus including a generator containing a solution of refrigerant in an absorption liquid, an absorber interconnected with said generator for circulation of absorption liquid therebetween, an evaporator interconnected with said absorber for circulation of an inert gas therebetween, a gas and liquid separating vessel having a liquid trap overflow connection to said evaporator, a conduit for flow of vapor from said generator to said vessel, a condenser connected to receive vapor from said vessel, a rectifier comprising a vessel adapted to maintain liquid received from said condenser in thermal transfer relation with said vapor conduit, and a thermosiphon for raising liquid from said rectifier to a higher level in said separating vessel.

8. In the method of refrigeration with an absorption type system which includes expelling refrigerant vapor from a solvent by heating, rectifying the expelled refrigerant vapor by cooling to cause condensation of vaporous solvent, condensing the refrigerant vapor to liquid, and flowing the liquid refrigerant to a place of evaporation, that improvement which consists in utilizing the heat of said rectification to raise the liquid refrigerant to a higher level in its path of flow toward said place of evaporation by thermosiphonic action.

9. In the method of refrigeration with an absorption type system which includes expelling refrigerant from a solvent by heating, rectifying the expelled refrigerant vapor by cooling to cause condensation of vaporous solvent, liquefying the refrigerant vapor in a condenser, and flowing the liquid refrigerant to an evaporator having an inlet above the liquid level in the condenser, that improvement which consists in utilizing the heat of said rectification to raise the liquid refrigerant from the condenser level to the evaporator inlet level by thermosiphonic action.

10. In the method of refrigeration with an absorption type system which includes expelling refrigerant vapor from a solvent by heating, rectifying the expelled refrigerant vapor by cooling to cause condensation of vaporous solvent, condensing the refrigerant vapor to liquid, and flowing the liquid refrigerant to a place of evaporation, that improvement which consists in utilizing the heat of said rectification to raise the liquid refrigerant to a higher level in its path of flow toward said place of evaporation by thermosiphonic action, and condensing vapor produced in such action.

11. In the method of refrigeration with an absorption type system which includes expelling refrigerant from a solvent by heating, rectifying the expelled refrigerant vapor by cooling to cause condensation of vaporous solvent, liquefying the refrigerant vapor in a condenser, and flowing the liquid refrigerant to an evaporator having an inlet above the liquid level in the condenser, that improvement which consists in utilizing the heat of said rectification to raise the liquid refrigerant from the condenser level to the evaporator inlet level by thermosiphonic action, and condensing vapor produced in said thermosiphonic action in said condenser.

12. In the method of refrigeration with an absorption type system which includes expelling refrigerant vapor from a solvent, condensing the expelled refrigerant vapor to liquid, and flowing the liquid refrigerant to a place of evaporation, that improvement which consists in conducting the liquid refrigerant in thermal transfer relation with said expelled vapor to cool the latter by vaporization of the liquid, and utilizing the vapor thus produced to raise the refrigerant liquid to a higher level in its path of flow toward said place of evaporation.

13. In the method of refrigeration with an absorption type system which includes expelling refrigerant vapor from a solvent, condensing the refrigerant vapor to liquid at a first level, and flowing the liquid refrigerant to a place of evaporation at a higher level, that improvement which consists in rectifying the expelled refrigerant vapor by transfer of heat to said liquid refrigerant, causing vaporization of the latter, and utilizing the vapor thus produced to raise the refrigerant liquid to said place of evaporation.

14. In the method of refrigeration with an absorption type system which includes expelling refrigerant vapor from a solvent, condensing the expelled refrigerant vapor to liquid by heat transfer to air, and flowing the liquid refrigerant to a place of evaporation, that improvement which comprises rectifying said expelled refrigerant vapor by heat transfer to said liquid refrigerant, causing vaporization of the latter, utilizing the vapor thus produced to raise the liquid refrigerant to a higher level in its path of flow toward said place of evaporation, and again condensing the vapor by heat transfer to air.

HUGO M. ULLSTRAND.